Oct. 8, 1963 K. F. LEHMANN 3,106,231
FILLING MACHINE
Filed Jan. 6, 1961 4 Sheets-Sheet 1

INVENTOR.
Karl Friedrich Lehmann
BY Clyde H. Haynes
George W. Reiber
ATTORNEYS

Oct. 8, 1963 K. F. LEHMANN 3,106,231
FILLING MACHINE
Filed Jan. 6, 1961 4 Sheets-Sheet 3

INVENTOR.
Karl Friedrich Lehmann
BY Clyde H. Haynes
George W. Reiber
ATTORNEYS

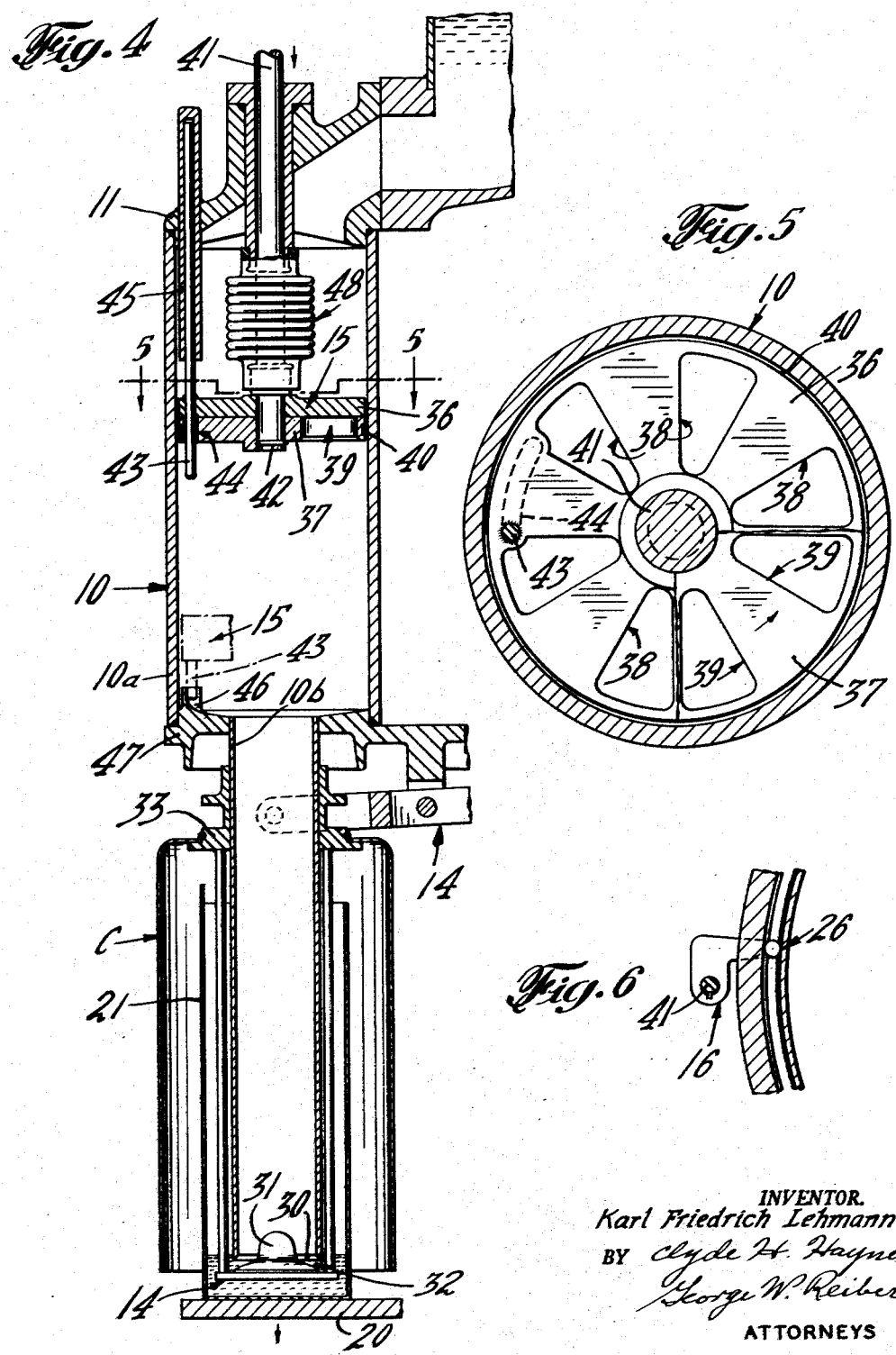

United States Patent Office 3,106,231
Patented Oct. 8, 1963

3,106,231
FILLING MACHINE
Karl Friedrich Lehmann, Barrington, Ill., assignor to American Can Company, New York, N.Y., a corporation of New Jersey
Filed Jan. 6, 1961, Ser. No. 81,020
8 Claims. (Cl. 141—253)

This invention relates to a measuring device and in a particular embodiment thereof to a measuring and dispensing device capable of dispensing measured quantities of fluid into containers.

One of the problems encountered in the past in designing dispensing machines capable of measuring and dispensing foamable fluids, such as milk, has been to provide turbulence-free flow of the fluid. It is well known that inaccurate measurements or spillage may result if foamable fluid is agitated or otherwise caused to foam during the measuring and dispensing of the fluid in containers.

In addition to preventing foaming of the fluid, the fluid must be kept free of contamination by outside foreign matter, including air. It has long been recognized that accurate measurements and fluid free of contamination are obtained more easily if air bubbles, air pockets, vacuum pockets or the like can be eliminated. Thus there is the problem of providing apparatus for measuring and dispensing quantities of fluid which inherently discourages the formation of foam as well as the formation of vacuum or air pockets in the fluid while it is being measured and dispensed. Additionally, there is the problem of designing the device in such a way that it will automatically rid itself of any vacuum or air pockets which might accidentally form in the fluid. Intermittent use of the device further adds the problem of easy disassembly, cleaning, and reassembly of the parts in the device.

Therefore, one of the objects of the present invention is to overcome the problems encountered in measuring and dispensing fluids with a device free of many of the deficiencies found in prior devices.

Another object of the present invention is to provide a measuring device capable of accurately measuring quantities of fluid.

Another object of the present invention is to provide a measuring and dispensing device capable of accurately measuring quantities of fluid and then dispensing the measured quantities of fluid into containers.

A further object of the invention is to provide a measuring device which is adjustable to accurately measure various preselected volume quantities of fluid.

A still further object of the invention is to provide a measuring device which is easy to clean and is self-draining.

Numerous other objects and advantages of the invention will be apparent as it is better understood from the following description, which, taken in connection with the accompanying drawings, discloses a preferred embodiment thereof.

Referring to the drawings:

FIG. 4 is a view similar to FIG. 3 showing the measuring device in a different position during its measuring cycle;

FIG. 5 is a sectional view taken at line 5—5 of FIG. 4;

FIG. 6 is a fragmentary sectional view taken approximately at line 6—6 of FIG. 1.

As used herein, the term "fluid" is intended to be broadly interpreted so as to include any foaming and non-foaming flowable products, including milk, liquids, flowable granules, and other like materials which may be pumped under pressure and which may run or flow by gravity. The term "milk" as used herein includes various types of milk such as homogenized milk, skim milk, cream and the like.

Figure 1:
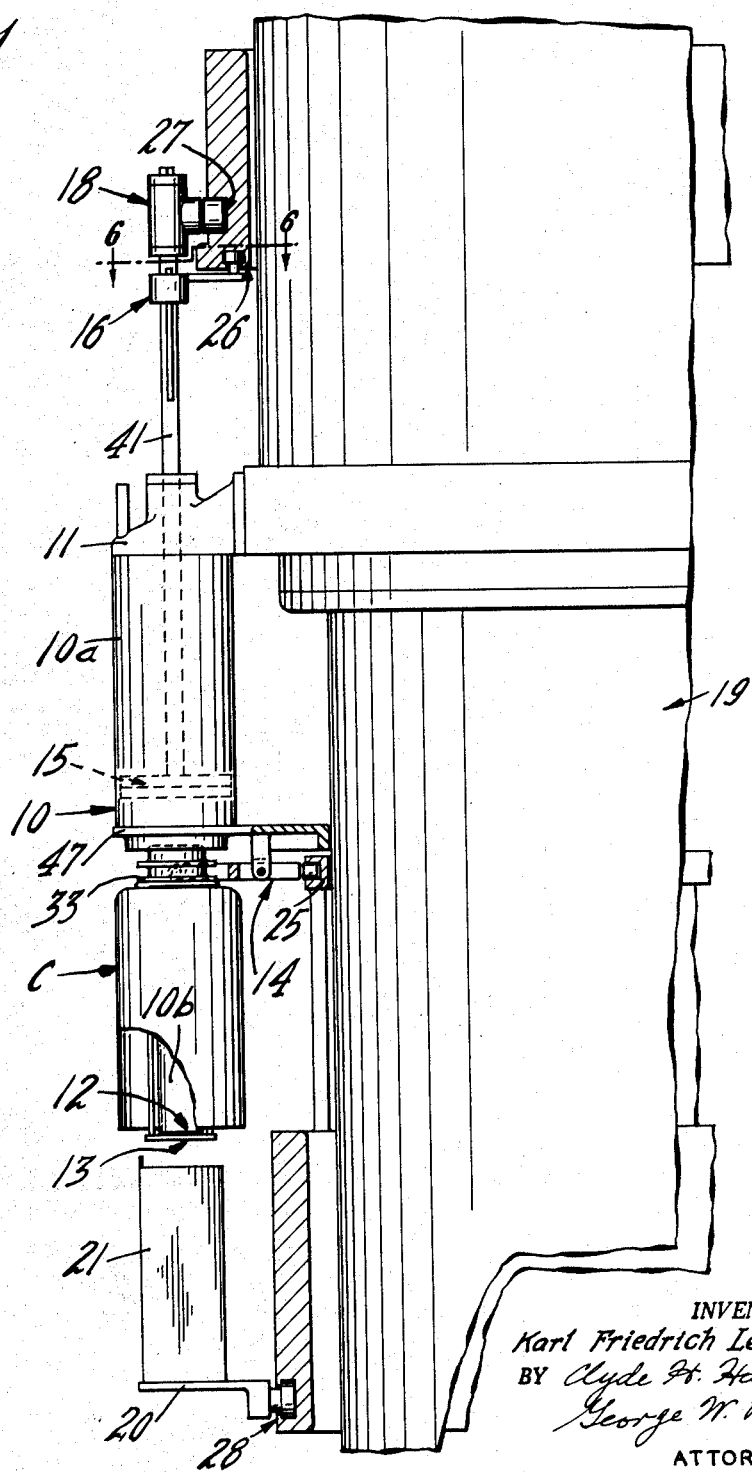
FIGURE 1 is an elevational view of the device.

Referring to FIG. 1, there is illustrated as one example or embodiment of the invention a measuring device for measuring quantities of fluid. This device comprises a hollow casing 10 having a fluid inlet 11 and an outlet end 12. The device also has a dispensing valve 13 at the outlet end 12 of the casing 10 operable when closed to seal the outlet end 12 of the casing 10 and operable when open to dispense fluid from the outlet end 12. A dispensing valve operator or actuating means 14 which will be more fully described later, opens and closes the dispensing valve 13. The device also includes a shutter valve 15 reciprocable in the casing 10 between the inlet 11 and the dispensnig valve 13. The shutter valve 15, which will be more fully described later, is movable through fluid in the casing 10 when open and, when closed, defines a seal movable in the casing 10. A shutter valve operator 16 opens and closes the shutter valve 15, and a stroker 18 moves the shutter valve 15 a preselected distance in at least one of its directions of reciprocation in the casing 10 in coordinated movement with the valve operators 14 and 16, thereby to cause the valves 13 and 15 to cooperatively measure a predetermined quantity of fluid. In the present embodiment, the stroker 18 reciprocates the shutter valve 15 a preselected length of stroke in the casing 10. The operation of stroker 18 is coordinated with the operation of valve operators 14 and 16 by a coordinator 19.

The coordinator 19 is further illustrated as being at least a part of a container filling machine which additionally includes a container supporter 20 operable to position a container 21 in a fluid receiving position at the outlet end 12 of the casing 10 and to remove the container 21 from that fluid receiving position after a measured quantity of fluid has been dispensed therein. Because filling machines which move containers into dispensing position under a dispensing and measuring valve are old, many of the details of mechanical structure of coordinator 19 have been omitted for purpose of clarity and because these details are not a part of the present invention. In the structure of FIG. 1 the coordinator 19 includes operable cam units 25, 26, 27, and 28, for the dispensing valve operator 14, the shutter valve operator 16, the stroker 18, and the container supporter 20 respectively. Each of the cam units conventionally has two parts movable relative to each other in accordance with the operation of coordinator 19 as set forth in the chart of FIG. 2, whereby the valve operators 14 and 16, the stroker 18 and the container supporter 20 work together as an integrated mechanism for actuating the valves 13 and 15 and moving the container 21 in the coordinated movement of a cycle of operation as set forth in the chart of FIG. 2.

Figure 3:
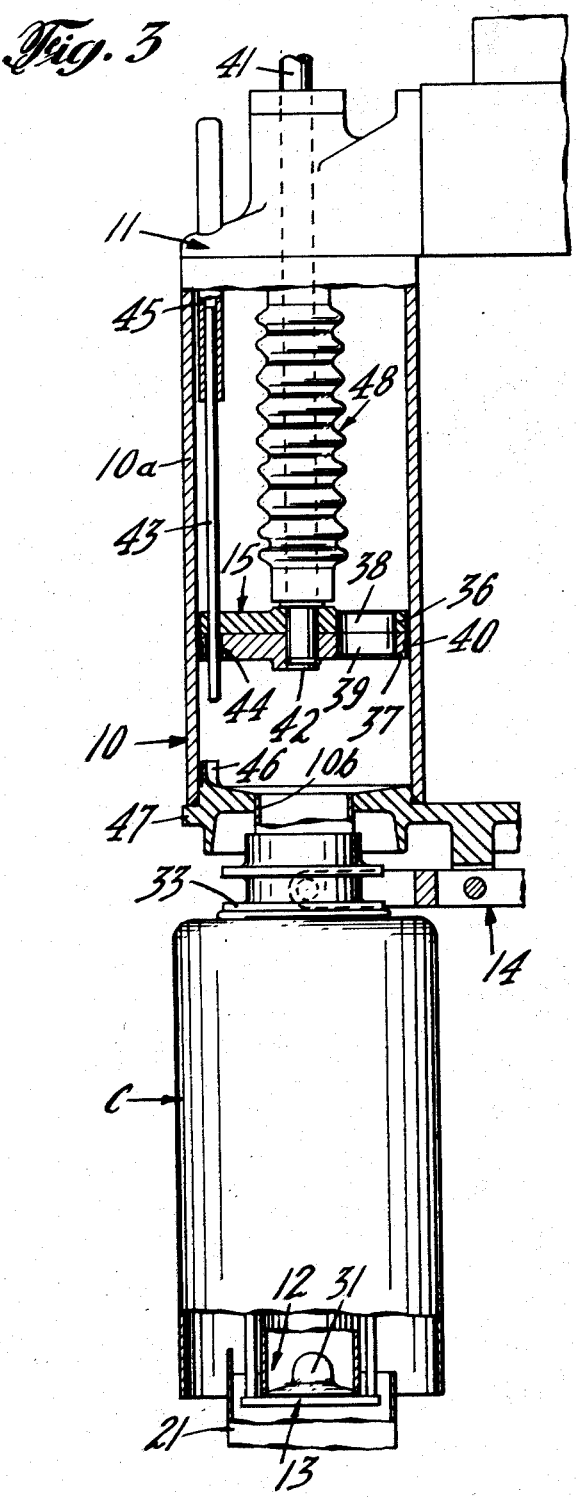
FIG. 3 is a fragmentary enlarged elevational view of the device in one position during its cycle of operation.

As illustrated in FIGURES 1 and 3 the coordinator 19 is operative to cause the dispensing valve operator 14 to render the dispensing valve 13 closed and the shutter valve operator 16 to render the shutter valve 15 open while the stroker 18 is moving the shutter valve 15 away from the dispensing valve 13 and outlet end 12 of casing 10. Additionally, and as illustrated in FIG. 4, the coordinator 19 is operative to cause the dispensing valve operator to render the dispensing valve 14 open and the shutter valve operator 16 to render the shutter valve 15 closed while the shutter valve 15 is moving towards the dispensing valve 13.

The casing 10 is arranged vertically with the dispensing valve 13 and outlet end 12 at the bottom end thereof so that fluid may flow by gravity from the casing 10 into the container 21. The dispensing valve operator opens the dispensing valve 13 a predetermined amount to permit flow of fluid from the casing 10 through the dispensing valve 13 and into the container 21 at a predetermined rate of flow. In addition, the shutter valve 15 moves towards the dispensing valve 13 at a rate of speed in which the volume of fluid in the casing 10 between the valves 13 and 15 diminishes as the fluid flows into the container 21. In the present embodiment the coordinator 19 synchronizes the operation of the stroker 18 with the container support 20 whereby the container is moved from the outlet end 12 while fluid is dispensed therein and at a rate in which the fluid level is above the outlet end until the dispensing valve 13 is closed. Also in the present embodiment, and in addition to rotatably moving the shutter valve 15 in at least one of its directions, the stroker 18 moves, and thus reciprocates the shutter valve 15 in the casing 10. The length of the stroke and the size of the casing 10 jointly determine the volume of fluid measured and dispensed into the container. The volume of the measured quantity may be easily adjusted by changing the length of the stroke, for example, by changing the cam follower portion of cam and cam follower unit 27.

Figure 7:
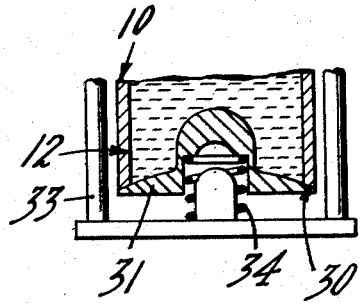
FIG. 7 is a fragmentary cross-sectional view illustrating the use of a spring cushion in the dispensing valve portion of the device.

The dispensing valve 13 consists of a peripheral valve seat 30 on the outlet end 12 of the casing 10 and a valve member 31 movable into and out of seated engagement with the valve seat 30. The valve member 31 and valve seat 30 when out of seated engagement define an annular dispensing opening 32 (see FIG. 4) extending peripherally about and at the outlet 12 end of the casing 10. The valve member 31 is maintained in operative relationship with the valve seat 30 by a reciprocating member 33 which is slidable along casing 10. The slider 33 carries the valve member 31 and is attached to the cam unit 25 such that cam unit 25 causes sliding movement of slider 33 on casing 10 to open and close valve 13. If desired the valve member 31 may be cushionably mounted on the slider 33 by interposing a spring 34 therebetween and as illustrated in FIG. 7.

It is noted that the shutter valve 15 and the valve member 33 are both reciprocable axially of the casing 10. Also, the valve slider 33 may carry an outer cover C if desired and which will telescopically enclose a container during filling thereof.

The shutter valve 15 comprises a pair of mated members 36 and 37 having apertures 38 and 39 respectively. The mated members have their engaged surfaces lap ground and are relatively oscillatable into an open position in which the apertures 38 and 39 are merged into a single opening through which fluid passes and into a closed position in which the apertures 38 and 39 are displaced from each other so that the shutter valve 15 defines a seal. In addition, one of the members, for example, member 37, is in sealed sliding engagement with the casing 10, a sealing ring 40 disposed therebetween insuring such sealing engagement.

The shutter valve 15 is supported by the stroker 18 which has a stroke rod 41 affixed at one end 42 thereof to members 36 and 37 and the other end coupled to cam unit 27. This stroker rod 41 extends axially of and from the inlet end 11 of the casing 10 and is mounted in the end 11 for sliding and oscillatory movement relative thereto. The mating member 36 is journaled on rod 41 for movement therewith in an axial direction and for relative oscillatory or rotary movement therebetween, whereas the mating member 37 is affixed to the slider rod for oscillatory and reciprocal movement therewith and thereby. Interassociated between the mating member 36 and the casing 10 is a restrainer rod 43 which arrests the mated member 36 against oscillatory movement relative to the casing 10. Restraining rod 43 is carried by and near the periphery of member 36, passes through a slot 44 in member 37 and is engageable at at least one of the ends thereof with suitable oscillatory movement arresting stops 45 and 46 to prevent relative oscillatory movement between member 36 and casing 10. Arresting stop 45 is in inlet end 11 and stop 46 is disposed between the valves 13 and 15.

The casing 10 has a large diameter casing portion 10a and a small diameter portion 10b fitted end to end and providing an internal shoulder 47 between the shutter valve 15 and the dispensing valve 13. The stop 46 is part of this shoulder 47 and is cooperatively associated with the shutter valve by way of rod 43 to restrain the member 36 of the shutter valve 15 from rotary and oscillatory movement in the large portion of the casing. Thus oscillatory movement of stroker rod 41 relative to casing 10 and by shutter valve operator 16 opens and closes shutter valve 15 while axial movement of rod 41 reciprocates the shutter valve 15 axially in casing 10.

A flexible bellows 48 may be interposed between rod 41 and inlet end 11 if desired to seal the rod 41 from fluid in the casing.

Figure 2:
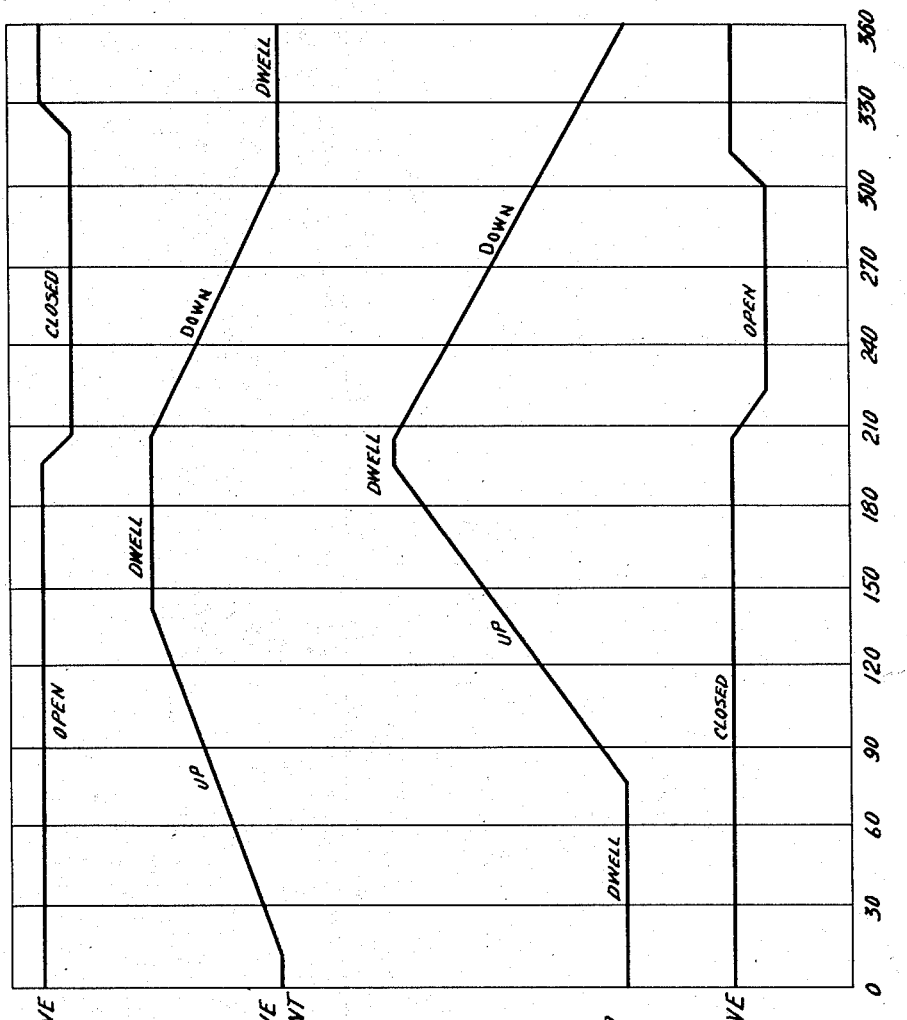
FIG. 2 is a chart of the coordinated movements of the parts in the device during a cycle of operation.

FIGURES 1, 3, and 4, illustrate the container 21, the filler valve 13 and the shutter valve 15 in several instantaneous positions along their paths of movement during coordinated cycle of operation set forth in FIG. 2. The container 21 to be filled has been placed on its support 20 and is about to be moved upwardly to filling position wherein it extends into cover C at the start of the cycle. At this time, and as illustrated in FIG. 1, the shutter valve 15 is open and in its lowermost position, the filler valve 13 is closed and the container 21 is down and free from surrounding the outlet end 12 of casing 10. Next, the shutter valve 15 is moved upwardly towards the inlet 11. While the shutter valve 15 is moving upwardly the container 21 is moved upwardly and about the outlet end 12 to filling position.

FIGURE 3 illustrates the position of the shutter valve 15 during this upward movement and at a time when the container has started to enter the cover C and surround the outlet end 12 of the casing 10. The open shutter valve 15 will pass through fluid in the casing and that fluid will remain in the casing 10 because the filler valve 13 is closed. The above-described upward movement of the shutter valve 15 continues until the shutter valve 15 reaches its uppermost position, approximately as illustrated in FIG. 4. The shutter valve 15 is closed while it is in this uppermost position. Also the container 21 is moved upwardly about the bottom end of the casing 10 until it reaches the position as illustrated in FIG. 4 wherein the bottom of the container 21 is approximately at the outlet end 12.

After the shutter valve 15 has reached its uppermost position and has been closed and the container 21 has moved to its uppermost position, the filling of the container is begun. The filler valve 13 is opened to allow fluid to flow by gravity from outlet end 12 into container 21. The container is moved downwardly away from the outlet end and the now-closed shutter valve 15 is moved downwardly towards the outlet end as the fluid in the casing 10 flows into the container 21. The shutter valve is moved downwardly at a speed required to displace the volume of fluid flowing outwardly through the filler valve 13 and into the container 21.

It is noted that the fluid will only flow into the container until the fluid has attained the elevation of or covered the outlet end 12. Immersion of the outlet end 12 in fluid in the container prevents air from entering the casing 10 through the filler valve 13. If the machine is stopped at any position during the container filling portion cycle, the fluid will stop flowing from the casing 10 through the filler valve 13 and into the container 21, providing the shutter valve 15 is allowed to remain closed. Atmospheric pressure against the fluid in the container 21 balances the head of fluid under the shutter valve 15 and in the casing 10 plus air pressure, if any, between the fluid in the casing 10 and the shutter valve 15 to hold the fluid in the casing 10. This prevents overfilling or spilling of fluid over the top of the container and also prevents dispensing more than the predetermined amount or quantity of fluid into the container. As long as the filling valve 13 is covered with fluid, no air can enter the valve and thus atmospheric pressure, which is greater than the fluid head in the casing 10 and below the shutter valve 15 stops the further flow of fluid through the valve. In those instances wherein the spring 34 is used, the spring acts to close the filler valve 13 immediately upon stopping of the machine to prevent further flow into the container.

After a predetermined quantity of fluid has been dispensed through the filler valve into the container 21, the filler valve is closed and the movement of the shutter valve in a downward direction is stopped. The container which has now been filled with a predetermined quantity of fluid is moved away from the outlet end of the casing 10 so that another container may be brought into position for filling. After the filler valve 13 has been closed, the shutter valve 15 is opened and made ready to be moved upwardly through fluid in the casing 10 in another cycle of operation.

Between the cycles of operation or filling containers the casing 10 remains completely filled with fluid which is held in the casing because the filler valve 13 is closed. Upon the opening of the shutter valve an escape passage is made for any air pocket which accidently may have entered the filler valve 13 and become trapped in the casing and under the shutter valve 15 during the filling of the preceding container. Such air pocket, if any, can easily pass through the now opened shutter valve and upwardly through the inlet end 11 of the device.

It is noted that the present filling device may be easily cleaned by flushing a cleaning fluid through the device in the direction of fluid flow. The valves and other parts are designed such that all internal surfaces which are contacted by fluid are easily engaged by cleaning fluid so that, if desired, the device may be cleaned while it is assembled. It is particularly noted that all internal surfaces are free of any pockets, crevices, or horizontal flat surfaces. Thus, fluid will completely drain away from all surfaces within the filling machine. For example, the filler valve 13 has sloping dome shaped and convex surfaces on the upper side thereof disposed internally of the casing 10. Thus with the present construction "in place" cleaning in which a great deal of assembly, cleanup and reassembly time can be eliminated has been provided. All cleaning fluids drain away from the internal surfaces of all valves and other parts of the filling and measuring device.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. A device for dispensing measured quantities of fluid comprising, a hollow casing having a fluid inlet and a fluid outlet spaced therefrom, a dispensing valve for sealing said outlet when closed and permitting fluid flow therefrom when open, an oscillatable shutter valve mounted for reciprocation in said casing between said inlet and said outlet, said shutter valve permitting fluid flow therethrough when open and defining a seal transversely of said casing when closed, a rod secured to said shutter valve and having a portion projecting exteriorly of said casing, first means operatively associated with said exterior rod portion for reciprocating said rod and thereby said shutter valve, second means operatively associated with said rod exterior portion for rotating said rod to open said shutter valve upon reciprocation thereof away from said dispensing valve and to close said shutter valve upon reciprocation thereof toward said dispensing valve, and actuating means for closing said dispensing valve while said shutter valve is open and opening said dispensing valve while said shutter valve is closed, to thereby dispense predetermined quantities of fluid from said casing.

2. The device of claim 1 wherein said casing is disposed vertically with said outlet at the lower end thereof, and further having a support beneath and vertically spaced from said outlet for receiving a container to be filled.

3. The device of claim 2 wherein said container support is mounted for vertical movement relative to said casing, and means for effecting relative movement therebetween to initially telescope a container about said casing and dispose said outlet adjacent the container bottom prior to opening actuation of said dispensing valve, and thereafter to withdraw said container from telescoping relation with said casing at a rate to maintain said outlet beneath the dispensed fluid level in said container during movement of said closed shutter valve toward said outlet, to thereby minimize fluid turbulence and air entrapment therein during dispensing thereof.

4. The device of claim 3 wherein a cover surrounds the lower portion of said casing for telescopically enclosing the container during the filling operation.

5. The device of claim 3 wherein said dispensing valve comprises a disc disposed beneath said outlet, and wherein said actuating means therefor comprises a reciprocating member mounted for axial movement relative to said casing, and a lost-motion connection between said reciprocating member and said disc comprising a compression spring lightly urging said disc toward said outlet when said reciprocating member is actuated to open the valve, the spring pressure being overcome by the pressure of the fluid dispensed through said outlet.

6. The device of claim 1 wherein said casing is cylindrical, said shutter valve comprises a pair of eccentrically apertured discs disposed in superposed relation, said rod is rotatably secured to one disc and fixedly secured to the other disc, and means operatively associated with said one disc and said casing to prevent relative rotation therebetween, whereby said second means oscillates said other disc to align the disc apertures during outlet-departing shutter valve reciprocation and misaligns said disc apertures during outlet-approaching shutter valve reciprocation.

7. The device of claim 6 wherein said means preventing relative rotation between said one disc and said casing comprises a guide rod journaled for axial sliding movement within said casing, said guide rod being secured to said one disc.

8. The device of claim 6 wherein one of said discs carries a seal ring for sliding sealing engagement with said casing.

References Cited in the file of this patent

UNITED STATES PATENTS

| 288,859 | Rigny | Nov. 20, 1883 |
| 1,296,852 | Robinson | Mar. 11, 1919 |
| 2,761,605 | Pahl et al. | Sept. 4, 1956 |